(12) United States Patent
Rhinehart

(10) Patent No.: US 6,185,484 B1
(45) Date of Patent: Feb. 6, 2001

(54) METHOD OF OPERATING A MOTOR VEHICLE MANAGEMENT COMPUTER SYSTEM

(75) Inventor: Matthew G. Rhinehart, Waukesha, WI (US)

(73) Assignee: Eaton Corporation, Cleveland, OH (US)

( * ) Notice: Under 35 U.S.C. 154(b), the term of this patent shall be extended for 0 days.

(21) Appl. No.: 09/129,275

(22) Filed: Aug. 5, 1998

(51) Int. Cl.$^7$ ...................................................... G06F 7/00
(52) U.S. Cl. .............................. 701/1; 345/326; 345/335
(58) Field of Search ........................ 701/1, 22; 345/504, 345/326, 335; 700/3

(56) References Cited

U.S. PATENT DOCUMENTS

| | | | |
|---|---|---|---|
| 4,787,040 | 11/1988 | Ames et al. ...................... | 364/424.01 |
| 4,811,240 | 3/1989 | Ballou et al. ......................... | 364/518 |

OTHER PUBLICATIONS

Michael Menkin and Mary Kay Winter; "Touch Sensitive Displays for Operation and Control", *Electronic Engineering*, Sep. 1983 pp. 3, 177–180.
W. Raymond Flynn, "Control Panels: From Pushbuttons to Keyboards to Touchscreens", *Control Engineering*, Jun. 198, pp. 79–81.
David M. Weber, "GM Tests Video Display in 1984 Production Car", *Electronics Week*, Nov. 12, 1984, pp. 28–29.
Edited by John A. Conway, "Driving by fingertip", *Forbes*, Nov. 19, 1984, p. 8.
Marshall Schuon, "Video Screen for Dashboard", *The New York Times*, Dec. 13, 1984, p. D2.
Miesterfeld, "An Innovative Approach in Designing an Electronic Instrument Cluster", No. 810308, pp. 101–106.

Myron U. Trenne and John J. Stephan, "Electronic Display Systems in the Automobile", No. 750365, pp. 101–107.
R.A. Young et al., "Displays for Driver Instrumentation: Today and A Look Toward Tomorrow", *2nd International Conference on Automotive Electronics*, pp. 293–297.
E. Zuckmantel, "On Board Control and Monitoring Systems for Automotive Vehicles", *2nd International Conference on Automotive Electronics*, pp. 253–257.
Rudiger Muller, "A Dedicated Single–Chip Microcoputer for Automotive Dashboard Applications", *SAE Technical Paper* Series #810307, pp. 97–100.
Jesse Ortega et al., "An Interactive, Reconfiguragble Display System for Automotive Instrumentation", *SAE Technical Paper* Series #860173, pp. 1–8.
W.H. Hucho, "Trends in the Development of Vehicle Instruments", *Int. J. of Vehicle Design*, vol. 5, No. 3, 1984, pp. 291–304.

Primary Examiner—William A. Cuchlinski, Jr.
Assistant Examiner—Yonel Beaulieu
(74) Attorney, Agent, or Firm—Quarles & Brady; George E. Haas

(57) ABSTRACT

A driver information system for a motor vehicle includes a network which executes one of a number of application programs depending on which function of the system the driver has selected at any given point in time. In response to the driver's selection, the appropriate application program is retrieved from storage for execution. Information regarding the specific hardware interface software objects that are required during that execution are read from the retrieved application program and loaded for execution. Thus only the software that is necessary to implement the selected function is loaded for execution which reduces the complexity of the hardware of the driver information system. A method for verifying the compatibility of each software program and object also is described.

5 Claims, 2 Drawing Sheets

METHOD OF OPERATING A MOTOR VEHICLE MANAGEMENT COMPUTER SYSTEM

BACKGROUND OF THE INVENTION

The present invention relates to control of components within a motor vehicle utilizing an on-board computer network; and more particularly to a process for sequentially executing a plurality of motor vehicle programs on the computer network.

Computer systems are finding greater application in motor vehicles, for engine control, dashboard displays and passenger comfort systems for example. This applies not only to passenger automobiles, but also to trucks such as long haul semi-trailer trucks. Computer systems allow monitoring and display of the functional performance of the truck, as well as vehicle tracking, guidance and logging of information required by governmental authorities. It is desirable to integrate all of these functions into one on-board computer. That integration allows the driver to select among available features and have the relevant information presented on a common display device within the truck cab.

Although it is possible to enable all of the software programs for these features to execute simultaneously on the computer, such simultaneous execution requires a relatively high speed, sophisticated microcomputer and other components. Thus such simultaneous execution significantly increases the cost of the computer system and it is always desirable to minimize the cost of any system. Therefore, it is preferable to enable the motor vehicle computer system to load and execute only the application program that implements the specific function selected by the driver. Similarly it is desirable to load only the interface routines which are required by that application program. In other words, a particular application program may not require access to certain network components and thus the interface routines for those components do not have to be loaded for execution. For example if the driver selects the application to monitor engine performance, that application does not require access to an external communication device, such as a cellular telephone, used to exchange data between the truck and a dispatch facility of the trucking company.

SUMMARY OF THE INVENTION

A general object of the present invention is to provide an economical computer system for monitoring vehicle operation and providing information to the driver.

Another object is to provide such a computer system which only loads and executes the specific software objects that are required to implement the functions selected by the driver.

A further object of the present invention is to provide a technique by which each application program identifies the support software object which are requires for execution.

These and other objectives are satisfied by storing a plurality of application programs which implement motor vehicle management functions and storing a plurality of hardware support objects for interfacing the application program to the data input devices and data output devices of the motor vehicle.

The operator of the motor vehicle selects a desired function to be performed by the driver information system which selection produces a designation of the application program which implements that function. Data is read from the selected application program which designation one or more of hardware support objects that are required by the selected application program. Those designated hardware support objects then are retrieved from storage for execution by the motor vehicle management computer system along with the selected application program.

The preferred embodiment of the present invention also stores validation codes in each application program and hardware support object. A list of the validation codes which correspond to specific application programs and hardware support objects that are authorized to be executed by the particular motor vehicle management computer system also are stored in a list. When a given application program or hardware support object is designated for execution, it is allowed to be executed only if its validation code is on the stored list. This prevents incompatible software from being executed which could adversely affect the operation of the motor vehicle.

DETAILED DESCRIPTION OF THE INVENTION

Figure 1:
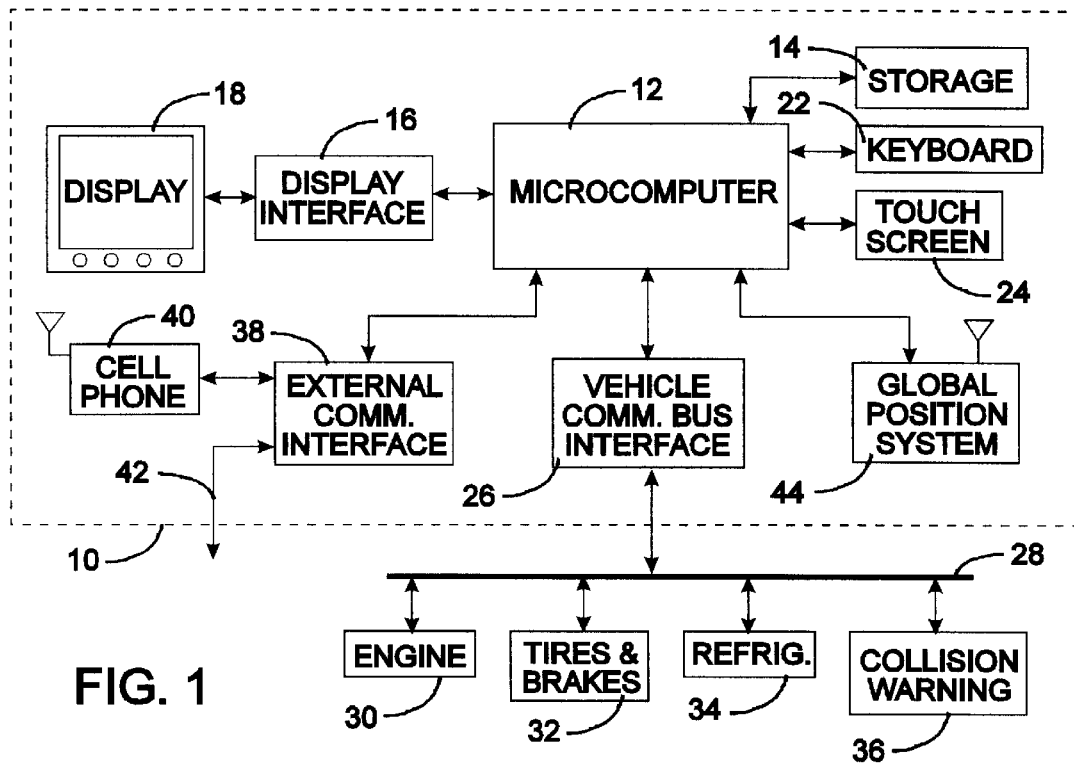
FIG. 1 is a block schematic diagram of an exemplary motor vehicle computer system on which the present invention may be implemented.

With initial reference to FIG. 1, a driver information system 10 for a motor vehicle is built around a microcomputer 12 which includes a conventional microprocessor, internal random access memory, read only memory, and interface circuitry. An external storage system 14 is connected to the microcomputer 12 and may comprise additional random access memory, a hard disk, a floppy disk, or a combination of those devices. The microcomputer 12 also is connected to a display interface 16 which translates output data into a format for display on a standard computer display device 18, such as an electroluminescent display, liquid crystal display, or similar device.

Adjacent to the display device 18 are components which allow the driver to select various functions of the computer system and enter data for processing. Specifically a keyboard 22, or other input device, is connected to an input port of the microcomputer 12. A conventional touch screen input device 24 may be associated with the display device 18 allowing the vehicle operator to select displayed items, such as from a menu by merely touching the surface of the display screen.

The microcomputer 12 also is coupled via vehicle communication bus interface 26 to other components and vehicle systems that are connected to an on-board truck communication network 28. For example, the engine control system 30 provides the driver information system 10 with data regarding engine performance. Such engine data may include intake air temperature, battery voltage, coolant level and temperature, engine power and speed, fuel usage, exhaust manifold pressure, oil pressure, vehicle speed and engine RPM. The driver information system 10 uses the engine performance data to derive other operational information about the vehicle, such as total engine operating hours, total vehicle hours, trip distance and trip fuel consumption. The driver information system 10 also can provide operational commands to the engine control system 30 for controlling sophisticated vehicle functions, such as cruise control, automatic shifting of the transmission and anti-lock braking.

Other truck components connected to the communication network 28 can include a mechanism 32 for monitoring tire pressure and brake wear. On refrigerator trucks, interface can be provided via the communication network 28 to the refrigerator controller 34. Additional components of the truck can include a collision warning system 36.

The driver information system 10 also interfaces to the external world via an external communication interface 38 which couples the microcomputer 12 to a communication device, such as a cellular telephone 40, two-way radio or communication satellite transceiver. A bidirectional port 42 allows an external computer system or communication link to be connected to the truck via a connector suitably located on the tractor cab. A conventional global positioning system (GPS) 44 also is interfaced to the microcomputer 12 thereby enabling the determination of the truck's present location. This location information can be utilized by the driver information system 10 to display a map for guiding the driver to a desired destination. In addition, the GPS information can be utilized to relay the truck's location to a dispatch facility of the trucking company via the external communication circuits 38 and 40. Other uses for the GPS information will be described herein.

Because of the large number of functions available on the driver information system 10, it is evident that all of the available information cannot be presented simultaneously to the driver in an easily readable and comprehendible form. As a consequence, the driver is able to display a menu of those various functions and select, via input devices 22 and 24, which function to be displayed at any given time. In response to that selection, the associated application software for that function is retrieved from the storage system 14, loaded into the microcomputer 12 and executed. Each application program requires additional hardware support objects in order for the application program to receive required input data and send output data to the appropriate devices.

Figure 2:
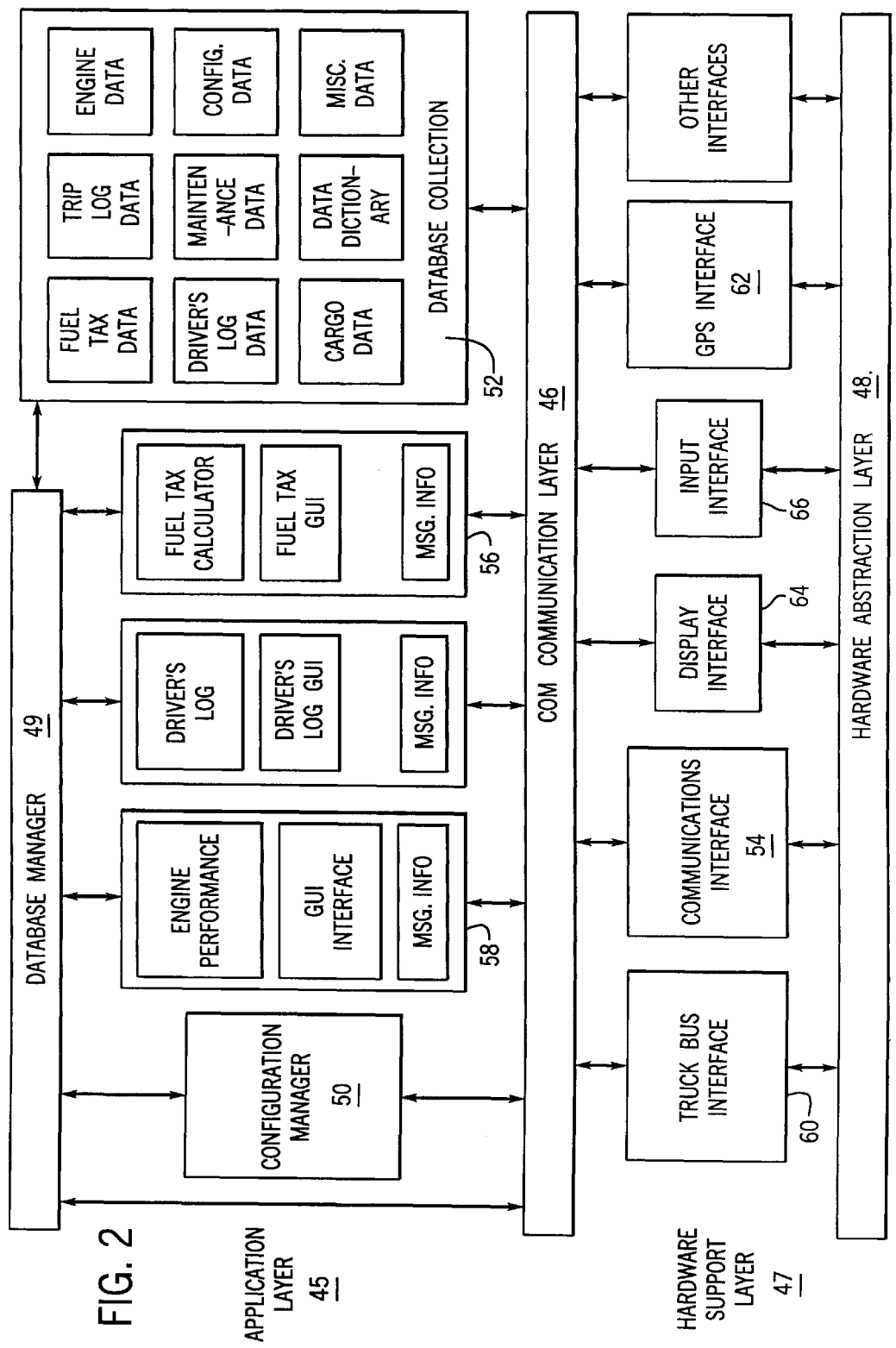
FIG. 2 is a diagram of the architecture layers of the software executed by the computer system.

With reference to FIG. 2, the architecture of the software for the driver information system 10 is organized in a number of layers as is conventional with complex computer systems. The upper layer in the drawing is a database manager 49 which archives and retrieves information retained in a database collection 52 in storage device 14. The database collection contains files of information regarding the functionality of the truck and data generated by the different application programs, as will be described. Application layer 45 comprises the main programs for implementing the various display functions, such as monitoring engine performance, maintaining the driver's log, calculating fuel taxes and handling the system configuration. The next software layer is a communication layer 46 which controls exchange of data between the selected application program and the hardware support layer 47. The hardware support layer 47 comprises a set of objects for interfacing the hardware devices, such as the external communication interface 38 or the vehicle communication bus interface 26. The lowest architectural layer, the hardware abstraction layer 48, consists of the software to communicate with the hardware devices of the computer system. These devices include the engine control system 30, collision warning circuit 36, cellular telephone 40 and global positioning system 44, among others.

The database manager 49 is an object that saves and retrieves persistent data in the storage system 14 as represented by the database collection 52 in FIG. 2. Examples of the persistent data are the trip log, vehicle maintenance history, travel itinerary and truck performance information. Most applications use the database manager 49 to save string based information along with geographical, temporal and driver information. For example, the database can be used for travel itinerary information in the following manner. When the driver logs into the truck at the beginning of a route the database manager saves the time and date of that event, as well as the geographical location based on latitude and longitude received from the global position system 44. Also saved are an action identifier indicating that the present event is a driver log-in and the driver's identification number entered into the keyboard 22. Similar information will be stored each time the driver shuts off and restarts the engine as occurs at each stop along the truck's route. The database information can be transferred by the database manager 49 via the communication interface object 54 and the external communication hardware interface 38 to an external communication system. This transfer can either be through the hardwired communication port 42 or the remote communication device, such as cellular telephone 40.

The communication interface object is part of the hardware support layer 47 which is composed of objects that interact with the physical devices of the computer system. These objects act as device drivers, virtual switches and software interfaces to any piece of hardware that may be attached to the system. These objects also provide a level of order to the system by being required to provide a validation code prior to loading. The validation code allows the configuration manager 50 to determine that a specific object will interact properly with the computer system and will not adversely affect the performance of this particular motor vehicle. Therefore only properly validated objects are allowed to run on the computer system.

With continuing reference to FIG. 2, the application layer 45 as previously described comprises application programs for implementing a wide variety of features. Each application layer object includes the software component that enables the microcomputer to perform the related function, a graphic user interface (GUI) for presenting data to the driver via a display 18 and a repertoire of message information for that display. It should be understood, the application layer 45 comprises a greater number of application programs than those illustrated.

The configuration manager 50 is an application program that always is running and supervises the operation of the driver information system 10. In that regard, configuration manager 50 monitors the processes, loads objects as needed, and unloads objects when they are no longer required. The configuration manager also provides the methodology for verifying that software components are all qualified to be executed on the driver information system 10 so that they will operate properly in the environment of this particular truck and will not adversely affect other systems.

Other application programs are loaded and executed by the microcomputer 12 only when needed to perform a function selected by the vehicle driver. An example of such an application program is the fuel tax calculator 56. This application tracks the amount of fuel purchased in each state, the quantity of fuel used in each state, and the amount of purchased fuel that is exempt from highway use tax (e.g. fuel consumed by the refrigeration equipment, power units, heaters, and during engine idling).

The fuel tax calculator 56 requires that the driver information system 10 know in which governmental state the vehicle is operating at 2 given points in time. This knowledge is obtained from the location information produced by the global position system 44 and information stored within the database collection 52 regarding the political boundaries of each governmental state. In addition, the fuel tax calculator 56 requires odometer readings and fuel consumption data from the engine control system 30 via the truck bus interface object 60. The driver also must enter information into the keyboard 22 that identifies the type, quantity, and price of the fuel purchased and whether the fuel was for the engine or non-engine consumption.

From that input data, the execution of the fuel tax calculator 56 by the microcomputer 12 determines the amounts of fuel purchased and used in each governmental state, and the quantity of fuel that is exempt from highway use taxes because of non-engine use. That cumulative information is conveyed to the database manager 49 for retention in the database collection 52 in storage system 14.

The fuel tax calculator application 56 also interacts with other network components, such as the external communication interface 38 and cellular telephone 40 to communicate the fuel information to the dispatch facility of the trucking company. Other application programs have similar requirements for connection to different components connected to the communication network 28 of the truck, as well as receiving data from the driver.

Therefore each of the application programs requires the use of selected hardware support objects 54 and 60–66 in order to perform their functions. For example the engine performance application program 58 needs to exchange data over the truck communication network 28 via the truck bus interface module 60 in FIG. 2, but does not require the use of the global positioning interface 62 or the communication interface 54. As a consequence those latter interface objects 54 and 62 do not have to be loaded for execution by the microcomputer 12 when the engine performance application program 58 has been selected by the driver.

By enabling the configuration manager 50 to determine which objects of the hardware support layer 47 are required in order to execute the selected application program, a slower and less sophisticated microcomputer 12 may be utilized than would otherwise be required if all of the hardware support layer objects had to execute continuously in order to accommodate all of the application programs which could be selected. Thus the present configuration manager 50 utilizes a technique by which it learns exactly which hardware support layer objects are required by a particular application program when the associated system function is selected by the driver.

When the driver chooses a function, such as the monitoring engine performance, the configuration manager 50 receives that selection from the keyboard 22 and loads the appropriate application program from the storage system 14 into active system memory for execution. Part of the information which is stored in the application object is authorization and verification data which enables the configuration manager 50 to determine that the retrieved application program is compatible for execution on this particular truck's computer system. Such verification is required in order to ensure that the particular software will not corrupt the performance of the computer system or the truck in general.

Figure 3:
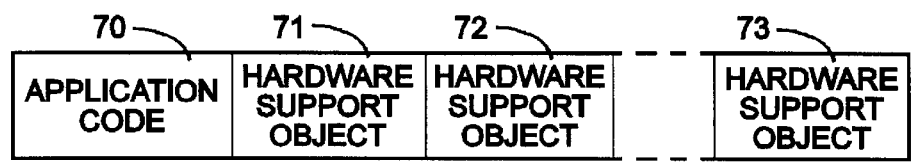
FIG. 3 depicts data contained in each application program to inform the computer system which support software objects are required for execution of that application program.

This authorization and verification data within the application program is contained in a data structure depicted in FIG. 3 and comprises a data field 70 containing an application code. The application code identifies not only the type of application, in this case an engine performance object, but the particular version of that application program. For example, different vehicles require distinct engine performance objects as their engine control systems and other components will be different. Therefore, the configuration manager 50 must not only verify that the object retrieved from storage device 14 is in fact an engine performance object, but that it is a particular engine performance object which is compatible with this specific vehicle. In order to do so, database collection 52 contains a table of specific application and hardware support objects which are compatible with this particular computer system and motor vehicle. The application code in data field 70 of the retrieved application program is compared to the table of compatible objects in the database collection 52 before the application program is enabled for execution can be executed. Such confirmation and verification eliminates the execution of an improper software program which could have inadvertently been stored in the driver information system 10.

Once the application program which has been retrieved from storage 14 has been verified as being a proper one for the presently selected function, the configuration manager inspects other data fields 71, 72 and 73 in the data structure of FIG. 3. These fields contain information identifying the particular hardware support layer objects 54 and 60–66 which are required during execution of the selected application object. For example in the case of the engine performance program 58, the computer system must also retrieve hardware support layer objects for the truck bus interface module 60 and the display interface 64 and input interface 66. Different application programs require different combinations of hardware support objects. For example, as noted previously the fuel tax calculator 56 requires not only the truck bus interface module object 60 but also the GPS interface 62 and the display and input interfaces 64 and 66 respectively. By loading only the minimum required hardware support layer objects; the size of the active memory and the complexity of the microcomputer can be minimized.

Each hardware support layer object contains a hardware support code, similar in function to the application code for an application program. When a given hardware support layer object is retrieved from the storage system 14 for execution, its hardware support code is read and compared to a list of valid hardware support codes stored in the driver information system 10. The given hardware support layer object will only be executed by the microcomputer 12 if its hardware support code is found on that list. This verification process prevents an improper hardware support layer object that was inadvertently placed in the storage system 12 from being executed by the driver information system 10. Such execution of an improper hardware support layer object could adversely affect the operation of the motor vehicle.

What is claimed is:

1. A method for selecting software to be executed by a motor vehicle computer system, said method comprising:

storing a plurality of application programs which implement functions of the motor vehicle;

storing a plurality of hardware support objects for interfacing the plurality of application programs to data input devices and data output devices of the motor vehicle;

storing a list of hardware support codes which identify specific hardware support objects;

receiving a designation of one of the application programs as designated by an operator of the motor vehicle;

reading, from the one of the application programs, designation of at least one of the plurality of hardware support objects which are required by the one of the application programs;

reading from the at least one of the plurality of hardware support objects a given hardware support code;

determining whether the given hardware support code is contained in the list of hardware support codes, and if so producing a validation indication; and executing the one of the application programs and the at least one of the plurality of hardware support objects in response to the validation indication.

2. The method as recited in claim 1 further comprising:

storing a list of application codes which identify specific application programs;

reading from the one of the application programs a given application code;

determining whether the given application code is contained in the list of application codes, and if so producing a validation indication; and executing the one of the application programs in response to the validation indication.

3. A method for selecting software to be executed by a motor vehicle computer system, said method comprising:

storing a plurality of application programs which implement motor vehicle functions;

storing a plurality of hardware support objects for interfacing the plurality of application programs to data input devices and data output devices of the motor vehicle;

storing a list of application codes which identify specific application programs;

receiving a designation of one of the application programs as designated by an operator of the motor vehicle;

reading, from the one of the application programs, a given application code;

determining whether the given application code is contained in the list of application codes, and if so producing a first validation indication;

enabling execution of the one of the application programs in response to the first validation indication;

reading, from the one of the application programs, designation of at least one of the plurality of hardware support objects which is required by the one of the application programs; and enabling execution of the at least one of the plurality of hardware support objects.

4. The method as recited in claim 3 further comprising:

storing a list of hardware support codes which identify specific hardware support objects;

reading from the at least one of the plurality of hardware support objects a given hardware support code;

determining whether the given hardware support code is contained in the list of hardware support codes, and if so producing a second validation indication; and enabling execution of the at least one of the plurality of hardware support objects in response to the second validation indication.

5. A method for selecting software to be executed by a driver information computer system for a motor vehicle, said method comprising:

storing a plurality of application programs which implement information display functions;

storing a plurality of hardware support objects for interfacing the plurality of application programs to data input devices and data output devices of the motor vehicle;

storing a list of application codes which identify specific application programs;

storing a list of hardware support codes which identify specific hardware support objects;

receiving a designation of one of the application programs as designated by an operator of the motor vehicle;

reading, from the one of the application programs, a given application code;

determining whether the given application code is contained in the list of application codes, and if so producing a first validation indication;

enabling execution of the one of the application programs in response to the first validation indication;

reading, from the one of the application programs, designation of at least one of the plurality of hardware support objects which is required by the one of the application programs;

reading from the at least one of the plurality of hardware support objects a given hardware support code;

determining whether the given hardware support code is contained in the list of hardware support codes, and if so producing a second validation indication; and enabling execution of the at least one of the plurality of hardware support objects in response to the second validation indication.

* * * * *